United States Patent
Melakari et al.

(10) Patent No.: US 10,771,774 B1
(45) Date of Patent: Sep. 8, 2020

(54) DISPLAY APPARATUS AND METHOD OF PRODUCING IMAGES HAVING SPATIALLY-VARIABLE ANGULAR RESOLUTIONS

(71) Applicant: Varjo Technologies Oy, Helsinki (FI)

(72) Inventors: Klaus Melakari, Oulu (FI); Evgeny Shirko, Saint-Petersburg (RU)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 16/361,669

(22) Filed: Mar. 22, 2019

(51) Int. Cl.
- *H04N 13/383* (2018.01)
- *H04N 13/332* (2018.01)
- *H04N 13/106* (2018.01)
- *G06F 3/01* (2006.01)

(52) U.S. Cl.
CPC ........... *H04N 13/383* (2018.05); *G06F 3/013* (2013.01); *H04N 13/106* (2018.05); *H04N 13/332* (2018.05)

(58) Field of Classification Search
CPC .... G06F 3/013; H04N 13/332; H04N 13/383; H04N 13/106
See application file for complete search history.

(56) References Cited

U.S. PATENT DOCUMENTS

| | | | | |
|---|---|---|---|---|
| RE43,490 E | * | 6/2012 | Gullichsen | H04N 5/2628 348/207.99 |
| 2007/0201149 A1 | * | 8/2007 | Nishioka | B82Y 20/00 359/793 |
| 2008/0122922 A1 | * | 5/2008 | Geng | G08B 13/19628 348/39 |
| 2014/0098186 A1 | * | 4/2014 | Seidl | G06T 15/10 348/36 |
| 2017/0070711 A1 | * | 3/2017 | Grundhofer | H04N 9/3182 |
| 2017/0285337 A1 | * | 10/2017 | Wilson | A61B 3/113 |
| 2018/0350032 A1 | * | 12/2018 | Bastani | G06T 3/0093 |

FOREIGN PATENT DOCUMENTS

GB          2569574          *  6/2019

* cited by examiner

*Primary Examiner* — Anner N Holder
(74) *Attorney, Agent, or Firm* — Ziegler IP Law Group, LLC

(57) ABSTRACT

A display apparatus includes an image renderer per eye, at least one optical element arranged on an optical path between the image renderer and an image plane and a processor coupled to the image renderer. The processor or an image source communicably coupled to the processor is configured to generate a warped image based upon the optical properties of the first optical portion and the second optical portion. The processor is configured to render the warped image via the image renderer, wherein projections of a first portion and a second portion of the warped image are to be differently magnified by the first optical portion and the second optical portion of the at least one optical element, respectively, to produce the image on the image plane in a manner that the produced image appears de-warped to a user. The image has a spatially-variable angular resolution on an image plane.

17 Claims, 11 Drawing Sheets

DISPLAY APPARATUS AND METHOD OF PRODUCING IMAGES HAVING SPATIALLY-VARIABLE ANGULAR RESOLUTIONS

TECHNICAL FIELD

The present disclosure relates generally to display apparatuses; and more specifically, to display apparatuses for producing images having spatially-variable angular resolutions. Moreover, the present disclosure also relates to methods of producing images having spatially-variable angular resolutions.

BACKGROUND

Nowadays, several specialized devices (for example, such as Augmented Reality (AR) headsets, Mixed Reality (MR) headsets, and the like) allow users to experience and interact with simulated environments (for example, such as AR, MR and the like). Such simulated environments enhance a user's experience of reality around him/her and provide the user with a feeling of immersion within the simulated environments, using contemporary techniques such as stereoscopy. Such specialized devices are commonly known as Head-Mounted Displays (HMDs).

Such HMDs are often video see-through devices that display a sequence of images upon display screens. Typically, an HMD displays different images of a given visual scene on separate display screens for left and right eyes of a user. As a result, the user is able to perceive a stereoscopic depth within the given visual scene.

However, conventional HMDs suffer from several disadvantages. Firstly, display screens used in the conventional HMDs are small in size. As a result, pixel densities offered by such display screens are insufficient to imitate a visual acuity of human eyes, so much so that display screens offering higher pixel densities are dimensionally too large to be accommodated in HMDs. Furthermore, a field of view of the display screens offering higher pixel densities is limited. Secondly, display screens used in the conventional HMDs require a large number of optical components to properly render a simulated environment. Moreover, some of these optical components are movable. Such large numbers of optical components are difficult to accommodate in the HMDs. Consequently, the conventional HMDs are not sufficiently well-developed and are limited in their ability to mimic the human visual system.

Therefore, in light of the foregoing discussion, there exists a need to overcome the aforementioned drawbacks associated with conventional display apparatuses.

SUMMARY

The present disclosure seeks to provide a display apparatus for producing an image having a spatially-variable angular resolution on an image plane. The present disclosure also seeks to provide a method of producing an image having a spatially-variable angular resolution on an image plane. An aim of the present disclosure is to provide a solution that overcomes at least partially the problems encountered in prior art.

In a first aspect, an embodiment of the present disclosure provides a display apparatus for producing an image having a spatially-variable angular resolution on an image plane, the display apparatus comprising:
an image renderer per eye;
at least one optical element arranged on an optical path between the image renderer and the image plane, the at least one optical element comprising at least a first optical portion and a second optical portion having different optical properties with respect to magnification; and
a processor coupled to the image renderer, wherein the processor or an image source communicably coupled to the processor is configured to generate a warped image based upon the optical properties of the first optical portion and the second optical portion,
wherein the processor is configured to render the warped image via the image renderer, wherein projections of a first portion and a second portion of the warped image are to be differently magnified by the first optical portion and the second optical portion, respectively, to produce the image on the image plane in a manner that the produced image appears de-warped to the user.

In a second aspect, an embodiment of the present disclosure provides a method of producing an image having a spatially-variable angular resolution on an image plane, the method being implemented via a display apparatus comprising an image renderer and at least one optical element arranged on an optical path between the image renderer and the image plane, the method comprising:
generating a warped image based upon optical properties of a first optical portion and a second optical portion of the at least one optical element, wherein the first optical portion and the second optical portion have different optical properties with respect to magnification;
rendering the warped image via the image renderer; and
differently magnifying projections of a first portion and a second portion of the warped image by the first optical portion and the second optical portion of the at least one optical element, respectively, to produce the image on the image plane in a manner that the produced image appears de-warped to the user.

Embodiments of the present disclosure substantially eliminate or at least partially address the aforementioned problems in the prior art, and facilitate production of a sequence of de-warped images having spatially-variable angular resolutions on an image plane, without increasing computational burden and a complexity of computational hardware.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 9A is a simplified illustration of a profile of a given optical element, while FIG. 10A is a schematic illustration of a symmetrical optical element, while

Figure 1:
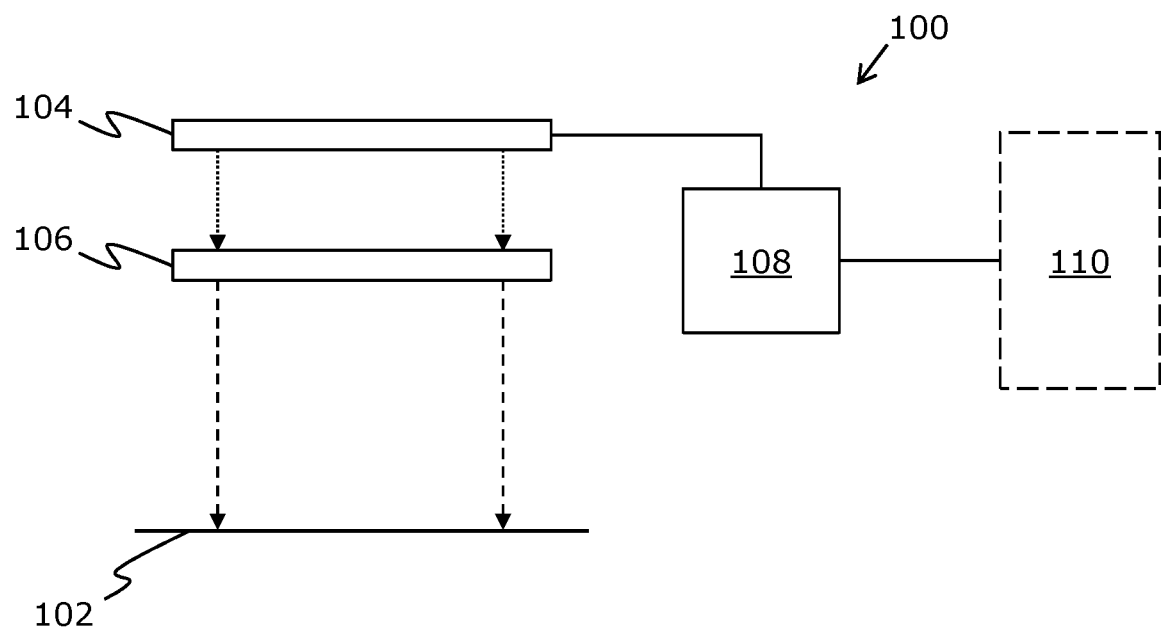
FIGS. 1 and 2 are schematic diagrams of a display apparatus, in accordance with different embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In a first aspect, an embodiment of the present disclosure provides a display apparatus for producing an image having a spatially-variable angular resolution on an image plane, the display apparatus comprising:

an image renderer per eye;

at least one optical element arranged on an optical path between the image renderer and the image plane, the at least one optical element comprising at least a first optical portion and a second optical portion having different optical properties with respect to magnification; and a processor coupled to the image renderer, wherein the processor or an image source communicably coupled to the processor is configured to generate a warped image based upon the optical properties of the first optical portion and the second optical portion, wherein the processor is configured to render the warped image via the image renderer, wherein projections of a first portion and a second portion of the warped image are to be differently magnified by the first optical portion and the second optical portion, respectively, to produce the image on the image plane in a manner that the produced image appears de-warped to the user.

In a second aspect, an embodiment of the present disclosure provides a method of producing an image having a spatially-variable angular resolution on an image plane, the method being implemented via a display apparatus comprising an image renderer and at least one optical element arranged on an optical path between the image renderer and the image plane, the method comprising: generating a warped image based upon optical properties of a first optical portion and a second optical portion of the at least one optical element, wherein the first optical portion and the second optical portion have different optical properties with respect to magnification;

rendering the warped image via the image renderer; and differently magnifying projections of a first portion and a second portion of the warped image by the first optical portion and the second optical portion of the at least one optical element, respectively, to produce the image on the image plane in a manner that the produced image appears de-warped to the user.

The present disclosure provides the aforementioned display apparatus and the aforementioned method of producing an image having a spatially-variable angular resolution on the image plane, via such a display apparatus. The aforementioned display apparatus and method are susceptible to be used for producing, on the image plane, a sequence of de-warped images having spatially-variable angular resolutions, without increasing computational burden and a complexity of computational hardware. Furthermore, the display apparatus described herein has a simple arrangement of few, small-sized immovable components that allow for properly rendering a simulated environment. The display apparatus and method utilize the at least one optical element to optically de-warp a sequence of warped images into the sequence of de-warped images, wherein the angular resolutions of these de-warped images vary spatially across the image plane. Beneficially, optical properties and/or geometrical properties of the at least one optical element also allow for enhancing a field of view of the image renderer.

Throughout the present disclosure, the term "display apparatus" refers to specialized equipment that is configured to present a simulated environment to the user when the display apparatus in operation is worn by the user on his/her head. In such an instance, the display apparatus acts as a device (for example, such as an Augmented Reality (AR) headset, a pair of AR glasses, a Mixed Reality (MR) headset, a pair of MR glasses and so forth) that is operable to present a visual scene of the simulated environment to the user. In an example, the visual scene may be an educational augmented reality video. In another example, the visual scene may be a mixed reality game.

When rendered, the warped image has a same angular resolution across an image rendering surface of the image renderer (namely, a surface of the image renderer on which the warped image is rendered). Upon being differently magnified, the projections of the first portion and the second portion of the warped image produce on the image plane a first de-warped portion and a second de-warped portion of the produced image, respectively. The terms "produced image" and "image produced on the image plane" have been used interchangeably throughout the present disclosure, to refer to the image that is made visible to the user on the image plane.

Throughout the present disclosure, the term "image plane" refers to an imaginary plane on which the produced image is visible to the user. Optionally, the image plane is at a distance that lies in a range of 25 cm to 400 cm from a perspective of a user's eye. More optionally, the image plane is at a distance that lies in a range of 50 cm to 100 cm from the perspective of the user's eye.

Pursuant to embodiments of the present disclosure, the angular resolution of the produced image varies spatially in a manner that an angular resolution of the first de-warped portion of the produced image is greater than an angular resolution of the second de-warped portion of the produced image. Throughout the present disclosure, the term "first de-warped portion of the produced image" refers to a region of the produced image which is produced upon passing/reflecting the projection of the first portion of the warped image through/from the first optical portion, whereas the term "second de-warped portion of the produced image" refers to a remaining region of the produced image or a part of the remaining region which is produced upon passing/reflecting the projection of the second portion of the warped image through/from the second optical portion. Beneficially, the angular resolution of the first de-warped portion is comparable to a normal human-eye resolution. Therefore, the produced image having such a spatially-variable angular resolution mimics foveation characteristics of the human visual system.

Optionally, the angular resolution of the first de-warped portion of the produced image is greater than or equal to twice the angular resolution of the second de-warped portion of the produced image. More optionally, the angular resolution of the first de-warped portion of the produced image is greater than or equal to six times the angular resolution of the second de-warped portion of the produced image. As an example, the angular resolution of the first de-warped portion may be approximately 90 pixels per degree, while the angular resolution of the second de-warped portion may be approximately 15 pixels per degree. Yet more optionally, the angular resolution of the first de-warped portion of the produced image is greater than or equal to ten times the angular resolution of the second de-warped portion of the produced image. As an example, the angular resolution of the first de-warped portion may be approximately 100 pixels per degree, while the angular resolution of the second de-warped portion may be approximately 10 pixels per degree.

Moreover, optionally, the angular resolution of the produced image decreases non-linearly on going from a centre of the first de-warped portion towards an edge of the produced image.

Alternatively, optionally, the angular resolution of the produced image decreases linearly on going from the centre of the first de-warped portion towards the edge of the produced image.

Yet alternatively, optionally, the angular resolution of the produced image decreases in a step-wise manner on going from the centre of the first de-warped portion towards the edge of the produced image. Optionally, in such a case, the first de-warped portion of the produced image has a first constant angular resolution, whereas the second de-warped portion of the produced image has a second constant angular resolution.

Throughout the present disclosure, the term "angular resolution" of a given image refers to a number of pixels per degree (namely, points per degree (PPD)) of an angular width of a given portion of the given image, wherein the angular width is measured from the perspective of the user's eye.

Optionally, an angular width of the first de-warped portion of the produced image lies in a range of 5 degrees to 60 degrees, while an angular width of the second de-warped portion of the produced image lies in a range of 40 degrees to 220 degrees. Herein, the term "angular width" refers to an angular width of a given portion of the produced image with respect to the perspective of the user's eye, namely with respect to a centre of the user's gaze. It will be appreciated that the angular width of the second de-warped portion is larger than the angular width of the first de-warped portion. The angular width of the second de-warped portion of the produced image may, for example, be from 40, 50, 60, 70, 80, 90, 100, 110, 120, 130, 140, 150, 160, 170, 180, 190, 200 or 210 degrees up to 50, 60, 70, 80, 90, 100, 110, 120, 130, 140, 150, 160, 170, 180, 190, 200, 210 or 220 degrees. Likewise, the angular width of the first de-warped portion of the produced image may, for example, be from 5, 10, 15, 20, 25, 30, 35, 40, 45, 50 or 55 degrees up to 10, 15, 20, 25, 30, 35, 40, 45, 50, 55 or 60 degrees.

Furthermore, throughout the present disclosure, the term "at least one optical element" refers to a configuration of one or more optical elements (for example, such as lenses, mirrors, prisms and so forth) that is capable of differently magnifying projections passing therethrough or reflecting therefrom. Notably, the at least one optical element is arranged on an optical path between the image renderer and the image plane. When the first and second optical portions of the at least one optical element pass or reflect the projections of the first and second portions of the warped image rendered at the image renderer, the projections of the first and second portions of the warped image are differently magnified by the first and second optical portions, respectively, to yield the produced image that appears de-warped to the user (namely, that does not appear warped to the user). In simpler words, the first and second optical portions of the at least one optical element optically de-warp the first and second portions of the warped image, respectively, to yield the first and second de-warped portions of the produced image.

Optionally, the at least one optical element is stationary. Optionally, in this regard, the at least one optical element is arranged on the optical path between the image renderer and the image plane in a manner that the projection of the first portion of the warped images passes through or reflects from the first optical portion, whereas the projection of the second portion of the warped images passes through or reflects from the second optical portion.

Pursuant to embodiments of the present disclosure, when generating the warped image, the processor or the image source is configured to generate the first and second portions of the warped image based upon optical properties of the first and second optical portions. Furthermore, the optical properties of the first and second optical portions are dependent upon shapes, sizes and relative positions of the first and second optical portions. Therefore, when generating the warped image, a warping effect to be implemented for generating the first and second portions of the warped image corresponds to the shapes, sizes and relative positions of the first and second optical portions. When suitably arranged to pass/reflect the projections of the first and second portions of the warped image, the first and second optical portions of the at least one optical element apply a de-warping effect that is an inverse of the warping effect that was applied during the generation of the warped image. As a result, the produced image appears de-warped to the user.

Throughout the present disclosure, the term "projections of the first and second portions of the warped image" refers to a collection of light rays emanating from the image renderer when the warped image is rendered thereat. The projections of the first and second portions of the warped image (namely, the collection of light rays) may transmit through and/or reflect from the at least one optical element and various other components of the display apparatus before reaching the user's eye. For purposes of embodiments of the present disclosure, the term "projections of the first and second portions of the warped image" has been used consistently, irrespective of whether the collection of light rays is transmitted or reflected.

Optionally, the at least one optical element is implemented as a single lens or mirror. In such a case, the first optical portion and the second optical portion are implemented as separate regions of the single lens or mirror. Alternatively, optionally, the at least one optical element is implemented as a configuration of multiple lenses and/or mirrors. In such a case, the first optical portion and the second optical portion are implemented as separate optical elements.

In an embodiment, the at least one optical element is a free-form mirror. Optionally, in this regard, a reflective surface of the free-form mirror is a combination of flat and curved surfaces. Notably, asymmetric radii of curvature of such flat and curved surfaces account for the free-form shape of the free-form mirror. Such curved surfaces can also be described using their conic constants. The free-form mirror is arranged to reflect a projection of the warped image towards an exit optical element. It will be appreciated that a variable curvature of the free-form mirror allows for increasing an apparent field of view (FOV) of the image renderer.

As an example, when the at least one optical element is the free-form mirror, a first optical portion and a second optical portion of the free-form mirror may be implemented by way of two spherical mirrors having radii of curvatures equal to 600 millimeters and 1200 millimeters, respectively. In such a case, curvatures of such spherical mirrors would be smoothly matched to form a continuous reflective surface of the free-form mirror. In other words, a profile of the free-form mirror is smooth and continuous. Furthermore, in such an example, when the projections of the first portion and the second portion of the warped image are differently magnified by the first optical portion and the second optical portion of the free-form mirror, respectively, the first de-warped portion of the produced image may have an angular resolution of approximately 60 pixels per degree and the second de-warped portion of the produced image may have an angular resolution of approximately 20 pixels per degree.

Throughout the present disclosure, the term "projection of the warped image" refers to a collective projection comprising the projections of the first portion and the second portion of the warped image.

Throughout the present disclosure, the term "exit optical element" refers to an optical component that is configured to direct a projection of the visual scene towards the user's eye, when the head-mounted display apparatus in operation is worn by the user. In particular, the exit optical element is configured to direct the differently magnified projection of the warped image (in other words, a projection of the produced image) towards the user's eye. Notably, the exit optical element is the component that is closest to the user's eye in the head-mounted display apparatus. Therefore, the term "exit optical element" may also be commonly referred to as an "eyepiece".

Furthermore, optionally, the at least one exit optical element is implemented by way of at least one of: a convex lens, a piano-convex lens, a Liquid Crystal (LC) lens, a liquid lens, a Fresnel lens, aspherical lens, achromatic lens, meniscus lens.

In another embodiment, the at least one optical element is a free-form lens. Optionally, in this regard, at least one surface of the free-form lens is a combination of flat and curved surfaces. Notably, asymmetric radii of curvature of such flat and curved surfaces account for the free-form shape of the free-form lens. Such curved surfaces can also be described using their conic constants. The free-form lens is arranged to allow a projection of the warped image to pass therethrough towards an optical combiner. It will be appreciated that a variable curvature of the free-form lens allows for increasing an apparent field of view (FOV) of the image renderer.

In yet another embodiment, the at least one optical element is an aspheric mirror. Optionally, in this regard, a reflective surface of the aspheric mirror has a complex surface profile which does not include portions of a sphere or a cylinder. The complex surface profile of the reflective surface of the aspheric mirror is defined by aspheric coefficients, conic coefficients and radius of curvature of the reflective surface. The aspheric mirror is arranged to reflect a projection of the warped image towards an exit optical element. Beneficially, the aspheric mirror allows for correction of spherical aberration within the display apparatus. Additionally, the complex surface profile of the aspheric mirror also allows for increasing an apparent field of view (FOV) of the image renderer.

In still another embodiment, the at least one optical element is an aspheric lens. Optionally, in this regard, at least one surface of the aspheric lens has a complex surface profile which does not include portions of a sphere or a cylinder. The complex surface profile of the at least one surface of the aspheric lens is defined by aspheric coefficients, conic coefficients and radius of curvature of the at least one surface. The aspheric lens is arranged to allow a projection of the warped image to pass therethrough towards an optical combiner. Beneficially, the aspheric lens allows for correction of spherical aberration within the display apparatus. Additionally, the complex surface profile of the aspheric lens also allows for increasing an apparent field of view (FOV) of the image renderer.

Moreover, throughout the present disclosure, by the phrase "differently magnified", it is meant that the first optical portion magnifies, de-magnifies, or neither magnifies nor de-magnifies the projection of the first portion of the warped image differently as compared to the second optical portion which magnifies, de-magnifies, or neither magnifies nor de-magnifies the projection of the second portion of the warped image. The various embodiments that allow for implementing such different magnification are described herein below.

Optionally, the projection of the first portion of the warped image is to be de-magnified by the first optical portion of the at least one optical element, and the projection of the second portion of the warped image is to be magnified by the second optical portion of the at least one optical element. In other words, the first optical portion of the at least one optical element shrinks the projection of the first portion of the warped image to yield the first de-warped portion of the produced image whereas the second optical portion of the at least one optical element magnifies the projection of the second portion of the warped image to yield the second de-warped portion of the produced image.

Alternatively, optionally, the projections of the first portion and the second portion of the warped image are to be magnified by the first optical portion and the second optical portion of the at least one optical element, respectively, wherein the projection of the second portion of the warped image is to be magnified to a greater extent than the projection of the first portion of the warped image. In such a case, a magnification factor of the second optical portion is greater than a magnification factor of the first optical portion.

Yet alternatively, optionally, the projections of the first portion and the second portion of the warped image are to be de-magnified by the first optical portion and the second optical portion of the at least one optical element, respectively, wherein the projection of the first portion of the warped image is to be de-magnified to a greater extent than the projection of the second portion of the warped image. In such a case, a de-magnification factor of the first optical portion is greater than a de-magnification factor of the second optical portion.

Still alternatively, optionally, the projection of the first portion of the warped image is to be de-magnified by the first optical portion of the at least one optical element, and the projection of the second portion of the warped image is to be neither magnified nor de-magnified by the second optical portion of the at least one optical element.

Yet alternatively, optionally, the projection of the first portion of the warped image is to be neither magnified nor de-magnified by the first optical portion of the at least one optical element, and the projection of the second portion of the warped image is to be magnified by the second optical portion of the at least one optical element.

Throughout the present disclosure, the term "magnification factor" refers to an extent to which a given portion of the warped image would appear enlarged when viewed through a given optical portion of the at least one optical element, while the term "de-magnification factor" refers to an extent to which a given portion of the warped image would appear shrunk when viewed through a given optical portion of the at least one optical element.

Moreover, optionally, the at least one optical element further comprises at least one intermediary optical portion between the first optical portion and the second optical portion, the at least one intermediary optical portion having different optical properties with respect to magnification as compared to the first optical portion and the second optical portion. Notably, the at least one intermediary optical portion could comprise a single intermediary optical portion or a plurality of intermediary optical portions. Throughout the present disclosure, the term "intermediary optical portion" refers to a portion of the at least one optical element that lies between the first optical portion and the second optical portion. In other words, an intermediary optical portion is a portion of the at least one optical element that surrounds the first optical portion, and is surrounded by the second optical portion.

Hereinafter, the phrase "different optical properties with respect to magnification" is interchangeably referred to as "different magnification and/or de-magnification properties", for the sake of convenience only.

By the phrase "different optical properties with respect to magnification", it is meant that the first optical portion and the second optical portion, and optionally, the at least one intermediary optical portion have different magnification and/or de-magnification properties, and are capable of selectively magnifying and/or de-magnifying projections of different portions of the warped image rendered at the image renderer.

As an example, each of the first optical portion, the second optical portion and the at least one intermediary optical portion may de-magnify the projections of the different portions of the warped image, wherein a de-magnification factor of the at least one intermediary optical portion is greater than the de-magnification factor of the second optical portion, but smaller than the de-magnification factor of the first optical portion.

As another example, the at least one intermediary optical portion may neither magnify nor de-magnify a projection of an intermediary portion of the warped image (namely, a portion between the first portion and the second portion of the warped image), while the first optical portion and the second optical portion may, respectively, de-magnify and magnify the projections of the first portion and the second portion of the warped image.

Optionally, the de-magnification factor (and optionally, the magnification factor) of the aforementioned optical portions of the at least one optical element is to vary spatially according to a spatial transfer function. The spatial transfer function may also be referred as a distortion function since it it similar as often used terms in geometric optics, namely barrel distortion and pincushion distortion. Optionally, in this regard, the de-magnification factor (and optionally, the magnification factor) of the different optical portions of the at least one optical element is to vary from an optical centre of the first optical portion towards an edge of the at least one optical element according to the spatial transfer function.

Optionally, the spatial transfer function defines how the de-magnification factor (and optionally, the magnification factor) varies at different optical portions of the at least one optical element. More optionally, the spatial transfer function is a function of two variables, wherein the two variables correspond to X and Y coordinates with respect to the optical centre of the first optical portion. Optionally, in such a case, the magnification and/or de-magnification properties of the at least one optical element vary differently along X and Y axes. It will be appreciated that the X and Y axes are fixed with respect to the image plane.

The spatial transfer function could be a linear gradient function, a non-linear gradient function or a step gradient function. Optionally, when the spatial transfer function is a linear gradient function or a non-linear gradient function, the de-magnification factor (and optionally, the magnification factor) of the first optical portion, the second optical portion, and optionally, the at least one intermediary optical portion do not change abruptly as discrete values, rather they change smoothly according to the spatial transfer function.

In an example case where the spatial transfer function is a linear gradient function, the de-magnification factor of the at least one optical element would change linearly and uniformly on going from the optical centre of the first optical portion towards the edge of the at least one optical element.

In another example case where the spatial transfer function is a non-linear gradient function, the de-magnification factor of the at least one optical element would change non-linearly on going from the optical centre of the first optical portion towards the edge of the at least one optical element.

In yet another example case where the spatial transfer function is a step gradient function, the de-magnification factor of the at least one optical element would change step wise on going from the optical centre of the first optical portion towards the edge of the at least one optical element. Optionally, in such a case, the at least one optical element comprises a flat lens with a first optical factor and a second optical factor in the first optical portion and the second optical portion, respectively. Such an optical element is easy to manufacture.

Optionally, the at least one optical element is symmetrical with respect to its optical axis, the first optical portion surrounding an optical centre of the at least one optical element, the second optical portion surrounding the first optical portion. Additionally, optionally, the second optical portion is surrounded by a periphery of the at least one optical element. One such symmetrical optical element has been illustrated in conjunction with FIG. 10A.

Optionally, when the first optical portion surrounds the optical centre of the at least one optical element and the second optical portion surrounding the first optical portion, the warped image is generated in a manner that the first portion of the warped image surrounds a centre of the warped image and the second portion of the warped image surrounds the first portion of the warped image. In particular, the warping effect to be implemented for generating the first and second portions of the warped image corresponds to the shapes, sizes and relative positions of the first and second optical portions.

Optionally, the first optical portion and/or the second optical portion have a substantially circular shape. Alternatively, optionally, the first optical portion and/or the second optical portion have a substantially elliptical shape. The terms "substantially circular" and "substantially elliptical" refer to a given shape that approximates a circle and an ellipse, respectively, within +/−20%, and more optionally, within +/−5%.

Optionally, the first optical portion and the second optical portion are concentric to each other.

More optionally, the shape of the first optical portion and/or the second optical portion is defined based upon an aspect ratio of the produced image (namely, an aspect ratio that is desired for the produced image). In an example, if the aspect ratio of 16:9 is required, the first optical portion and/or the second optical portion may have a substantially elliptical shape. In another example, if the aspect ratio of 1:1 is required, the first optical portion and/or the second optical portion may have a substantially circular shape.

Optionally, when there are one or more intermediary optical portions between the first optical portion and the second optical portion, the shape of such intermediary optical portions is similar to the shape of the first optical portion and/or the second optical portion.

Optionally, the image source comprises a processor configured to generate computer graphics.

Additionally or alternatively, the image source comprises an imaging unit comprising at least one camera and at least one warping optical element. Optionally, the at least one warping optical element comprises a first warping portion and a second warping portion, wherein optical properties of the first and second warping portions of the at least one warping optical element are substantially inverse of the optical properties of the first and second optical portions of the at least one optical element, respectively. By "substantially inverse", it is meant that the first and second portions of the warped image (that were generated using the first and second warping portions), when rendered at the image renderer, can be optically de-warped by the first and second optical portions of the at least one optical element, to produce the image that appears de-warped to the user.

Optionally, in a case where the imaging unit is employed, projections of a first region and a second region of a given real-world scene are differently magnified by the first warping portion and the second warping portion of the at least one warping optical element to generate the first portion and the second portion of the warped image, respectively. Optionally, in this regard, a number of pixels employed for capturing a particular angular width (namely, the PPD) of the first region of the given real-world scene is greater than a number of pixels employed for capturing that particular angular width (namely, the PPD) of the second region of the given real-world scene.

In some implementations, the imaging unit is integrated with the display apparatus. As an example, the imaging unit could be mounted, for example, on an outer surface of the display apparatus, such that the at least one camera faces the given real-world scene.

In other implementations, the imaging unit is implemented on a remote device that is separate from the display apparatus. Optionally, the imaging unit is mounted on the remote device. In such implementations, the imaging unit and the display apparatus are communicably coupled via a wired interface or a wireless interface.

Optionally, the remote device is physically positioned at the given real-world scene, whereas the user of the display apparatus is positioned away from (for example, at a distance from) the remote device. In such an implementation, the imaging unit and the display apparatus are communicably coupled via a wired interface or a wireless interface.

The processor could be implemented as hardware, software, firmware or a combination of these. The processor is coupled to various components of the display apparatus, and is configured to control the operation of the display apparatus.

Throughout the present disclosure, the term "image renderer" refers to equipment that, when operated, renders a sequence of warped images. Beneficially, the image renderer has a same display resolution throughout its array of pixels. In other words, the image renderer has a same pixel density throughout the entire array of pixels. When the warped image is rendered via the image renderer, the projections of the first and second portions of the warped image emanate from the image rendering surface of the image renderer.

Optionally, the image renderer is implemented as a display. Optionally, the display is selected from the group consisting of: a Liquid Crystal Display (LCD), a Light Emitting Diode (LED)-based display, an Organic LED (OLED)-based display, a micro OLED-based display, a Liquid Crystal on Silicon (LCoS)-based display, and a Cathode Ray Tube (CRT)-based display.

As an example, the image renderer may be implemented as an LCD having a backlight. The backlight may be an LED-based light source, a Xenon flash-based light source, a laser-based light source or similar.

Optionally, the image renderer is implemented as a projector and a projection screen associated therewith. Optionally, the projector is selected from the group consisting of: an LCD-based projector, an LED-based projector, an OLED-based projector, an LCoS-based projector, a Digital Light Processing (DLP)-based projector, and a laser projector.

For illustration purposes only, there will now be considered an example wherein a given warped image having 45 degrees angular width is rendered on the image renderer having the display resolution of 1000×1000 pixels. Moreover, in such an example, a first portion of the given warped image corresponds to a central 500×500 pixels (or a central 22.5 degrees angular width) of the given warped image whereas a second portion of the given warped image corresponds to remaining pixels of the given warped image. In such a case, the given warped image would have a constant angular resolution approximately equal to 22 pixels per degree (since 1000 pixels divided by 45 degrees equals 22.22 pixels per degree). In other words, an angular resolution of both the first portion and the second portion of the given warped image would be approximately equal to 22 pixels per degree.

There will now be considered that projections of the first portion and the second portion of the given warped image are de-magnified and magnified by the first optical portion and the second optical portion of the at least one optical element, respectively. Such different magnification produces a given image on the image plane in a manner that the given image appears de-warped to the user.

In such example implementation, an apparent angular width of a first portion of the de-warped image may be 15 degrees, whereas an apparent angular width of a second portion of the de-warped image may be 45 degrees. As a result, in the produced given image, an angular resolution of the first de-warped portion would be approximately equal to 33 pixels per degree (since 500 pixels divided by 15 degrees equals 33.33 pixels per degree), whereas an angular resolution of the second de-warped portion would be approximately equal to 11 pixels per degree (since 500 pixels divided by 45 degrees equals 11.11 pixels per degree). In other words, the produced given image would have a spatially variable angular resolution.

Optionally, when generating the warped image, the processor or the image source is configured to adjust an intensity of the first portion and the second portion of the warped image in a manner that, upon being differently magnified, the projections of the first portion and the second portion of the warped image produce the image on the image plane that appears to have a uniform brightness across the image. This enables the display apparatus to avoid an increase in brightness in the first de-warped portion of the produced image as compared to the second de-warped portion of the produced image. Notably, pixels of the first de-warped portion appear smaller than pixels of the second de-warped portion. If the intensity of the first portion and the second portion of the warped image is not adjusted, the pixels of the first de-warped portion would appear brighter than the pixels of the second de-warped portion.

Optionally, in this regard, the intensity of the first portion and the second portion of the warped image is adjusted by decreasing the intensity of the first portion of the warped image, and/or by increasing the intensity of the second portion of the warped image.

Moreover, optionally, when generating the warped image, the processor or the image source is configured to blend a boundary region between the first portion and the second portion of the warped image, so as to smoothen any abrupt change in the first portion and the second portion of the warped image. Optionally, such blending can be performed using image smoothing functions (for example, such as low pass filtering, averaging functions, and the like).

Optionally, the display apparatus further comprises means for detecting a gaze direction of the user, the gaze direction being detected with respect to the image plane, wherein the processor or the image source is configured to generate the warped image based upon the detected gaze direction of the user. Notably, the warped image is to be generated in a manner that the first portion of the warped image corresponds to a region of interest of the visual scene at which the user is gazing, whereas the second portion of the warped image corresponds to a remaining region of the visual scene. Therefore, the projections of the first portion and the second portion of the warped image are differently magnified by the first optical portion and the second optical portion of the at least one optical element, respectively, to produce on the image plane the first de-warped portion of the produced image and the second de-warped portion of the produced image, respectively. In such a case, the first de-warped portion of the produced image is a portion of the produced image whose image is formed on and around a fovea of the user's eye, whereas the second de-warped portion of the produced image is a portion of the produced image whose image is formed on a remaining part of a retina of the user's eye.

It will be appreciated that the means for detecting the gaze direction of the user allow for the display apparatus to implement gaze contingency as in the human visual system whist presenting the simulated environment to the user.

In an embodiment, the warped image is generated from an image captured by the imaging unit. Such a captured image appears warped (namely, distorted). Optionally, the processor or the image source is configured to crop the captured image, based upon the detected gaze direction of the user, to generate the warped image.

In another embodiment, the warped image is generated using computer graphics, based upon the detected gaze direction of the user.

Throughout the present disclosure, the term "means for detecting a gaze direction" refers to specialized equipment for detecting and/or tracking the gaze direction of the user. Such specialized equipment are well known in the art. For example, the means for detecting the gaze direction can be implemented using contact lenses with sensors, cameras monitoring a position of a pupil of the user's eye, infrared (IR) light sources and IR cameras, a bright pupil-detection equipment, a dark pupil-detection equipment and the like. Beneficially, said means is arranged in a manner that it does not cause any obstruction in the user's view.

It will be appreciated that said means is employed to detect the gaze direction of the user repeatedly over a period of time, when the display apparatus in operation is worn by the user. Optionally, the processor or the image source is configured to generate the sequence of warped images, based upon instantaneous gaze directions of the user detected during operation, in real-time or near real-time.

The sequence of warped images is then rendered via the image renderer. Upon being differently magnified, projections of different portions of these warped images produce a sequence of de-warped images. The sequence of de-warped images creates the visual scene of the simulated environment that is presented to the user.

Optionally, the display apparatus further comprises means for tracking a head orientation of the user, wherein the processor or the image source is configured to generate the warped image based upon the head orientation of the user. Notably, the head orientation is to be tracked when the display apparatus in operation is worn by the user. Throughout, the present disclosure, the term "means for tracking a head orientation" refers to specialized equipment for detecting and optionally, following the orientation of the user's head, when the display apparatus is worn by the user. Optionally, the means for tracking the head orientation of the user is implemented by way of a gyroscope and an accelerometer.

It will be appreciated that the means for tracking the head orientation of the user is employed when the imaging unit is implemented on the remote device and the remote device is physically positioned at the given real-world scene, whereas the user of the display apparatus is positioned away from the remote device.

Optionally, in this regard, the imaging unit further comprises:
- at least one actuator attached to a base that supports the at least one warping optical element and the at least one camera; and
- a processor coupled to the at least one camera and the at least one actuator, wherein the processor is configured to:
  receive, from the display apparatus, information indicative of the current head orientation and gaze direction of the user; and
  control the at least one actuator to adjust an orientation of the at least one warping optical element and the at least one camera, based upon the current head orientation and gaze direction of the user.

An image so captured by the imaging unit conforms to a current perspective of the user. As a result, the visual scene presented to the user provides a greater sense of immersion to the user.

Moreover, the present disclosure also relates to the method as described above. Various embodiments and variants disclosed above, with respect to the aforementioned first aspect, apply mutatis mutandis to the method.

Optionally, the method further comprises detecting the gaze direction of the user with respect to the image plane, wherein the warped image is generated based upon the detected gaze direction of the user.

Optionally, the method further comprises tracking the head orientation of the user, wherein the warped image is generated based upon the head orientation of the user.

Optionally, in the method, the step of differently magnifying comprises de-magnifying the projection of the first portion of the warped image by the first optical portion of the at least one optical element, whilst magnifying the projection of the second portion of the warped image by the second optical portion of the at least one optical element.

Alternatively, optionally, in the method, the step of differently magnifying comprises magnifying the projections of the first portion and the second portion of the warped image by the first optical portion and the second optical portion of the at least one optical element, respectively, wherein the projection of the second portion of the warped image is magnified to the greater extent than the projection of the first portion of the warped image.

Yet alternatively, optionally, in the method, the step of differently magnifying comprises de-magnifying the projections of the first portion and the second portion of the warped image by the first optical portion and the second optical portion of the at least one optical element, respectively, wherein the projection of the first portion of the warped image is de-magnified to the greater extent than the projection of the second portion of the warped image.

Optionally, in the method, the step of generating the warped image comprises adjusting an intensity of the first portion and the second portion of the warped image in a manner that, upon being differently magnified, the projections of the first portion and the second portion of the warped image produce the image on the image plane that appears to have a uniform brightness across the image.

DETAILED DESCRIPTION OF THE DRAWINGS

Referring to FIG. 1, illustrated is a schematic diagram of a display apparatus 100 for producing an image having a spatially-variable angular resolution on an image plane 102, in accordance with an embodiment of the present disclosure. The display apparatus 100 comprises an image renderer per eye (depicted as an image renderer 104, for the sake of simplicity), at least one optical element (depicted as an optical element 106, for the sake of simplicity), and a processor 108 coupled to the image renderer 104.

The optical element 106 comprises at least a first optical portion and a second optical portion having different optical properties with respect to magnification. The processor 108 or an image source 110 communicably coupled to the processor 108 is configured to generate a warped image based upon the optical properties of the first optical portion and the second optical portion.

The processor 108 is configured to render the warped image via the image renderer 104, wherein projections of a first portion and a second portion of the warped image are to be differently magnified by the first optical portion and the second optical portion, respectively, to produce the image on the image plane 102 in a manner that the produced image appears de-warped to a user.

FIG. 1 is merely an example, which should not unduly limit the scope of the claims herein. It is to be understood that the specific designation for the display apparatus 100 is provided as an example and is not to be construed as limiting the display apparatus 100 to specific numbers or types of image renderers, optical elements, and processors. A person skilled in the art will recognize many variations, alternatives, and modifications of embodiments of the present disclosure.

Figure 2:
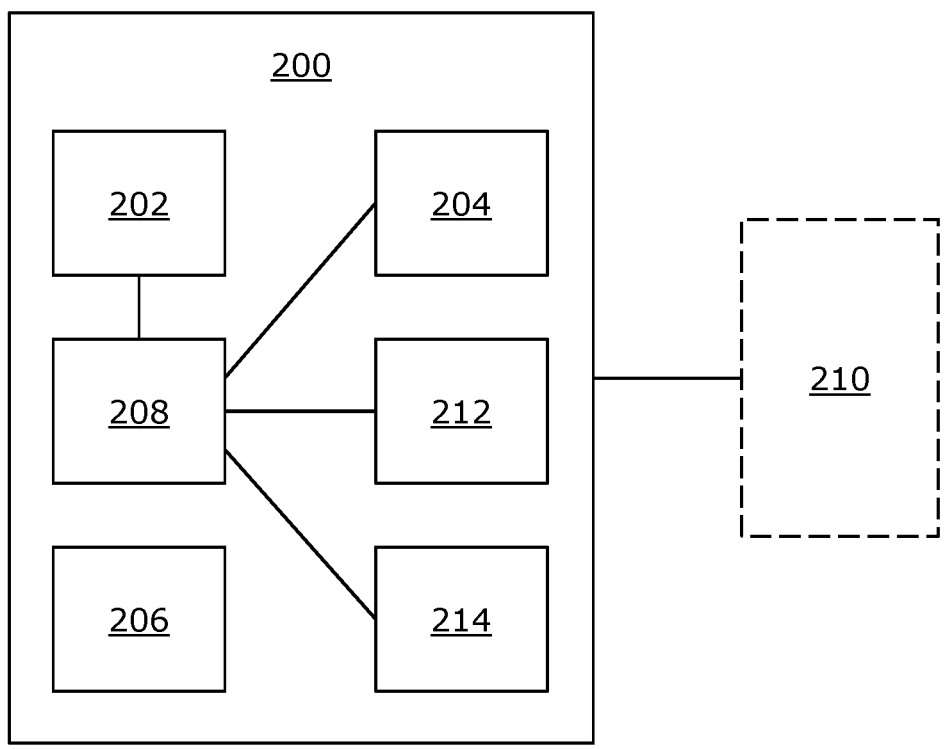

Referring to FIG. 2, illustrated is a schematic diagram of a display apparatus 200 for producing an image having a spatially-variable angular resolution on an image plane, in accordance with another embodiment of the present disclosure. The display apparatus 200 comprises an image renderer per eye (depicted as an image renderer 202 for a left eye and an image renderer 204 for a right eye), at least one optical element (depicted as an optical element 206), and a processor 208 coupled to the image renderers 202 and 204.

The optical element 206 comprises at least a first optical portion and a second optical portion having different optical properties with respect to magnification. The processor 208 or an image source 210 communicably coupled to the processor 208 is configured to generate a warped image based upon the optical properties of the first optical portion and the second optical portion.

The processor 208 is configured to render the warped image via the image renderers 202 and 204, wherein projections of a first portion and a second portion of the warped image are to be differently magnified by the first optical portion and the second optical portion, respectively, to produce the image on the image plane in a manner that the produced image appears de-warped to a user.

The display apparatus 200 further comprises means 212 for detecting a gaze direction of the user, the gaze direction being detected with respect to the image plane, wherein the processor 208 or the image source 210 is configured to generate the warped image based upon the detected gaze direction of the user.

Moreover, the display apparatus 200 further comprises means 214 for tracking a head orientation of the user, wherein the processor 208 or the image source 210 is configured to generate the warped image based upon the head orientation of the user.

FIG. 2 is merely an example, which should not unduly limit the scope of the claims herein. It is to be understood that the specific designation for the display apparatus 200 is provided as an example and is not to be construed as limiting the display apparatus 200 to specific numbers or types of image renderers, optical elements, processors, means for detecting the gaze direction and means for tracking the head orientation. A person skilled in the art will recognize many variations, alternatives, and modifications of embodiments of the present disclosure.

Figure 3:
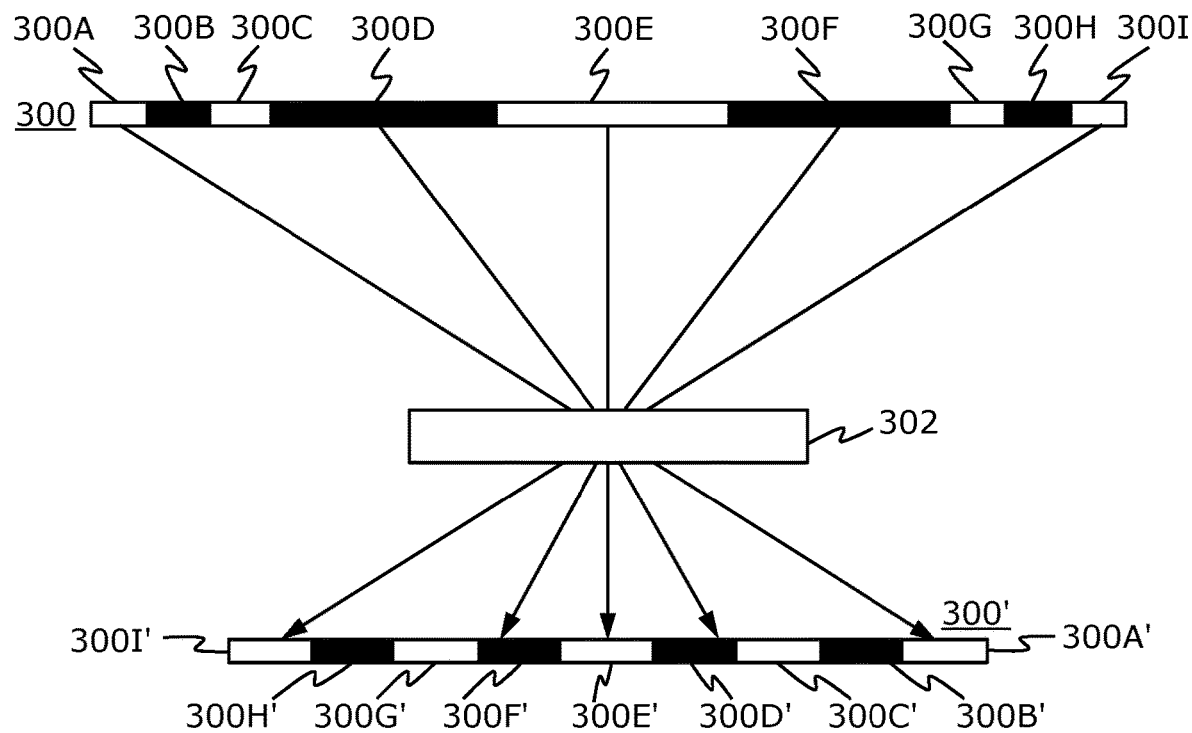
FIG. 3 is a schematic illustration of how different portions of a warped image are differently magnified by at least one optical element to produce an image on an image plane, in accordance with an embodiment of the present disclosure.

Referring to FIG. 3, illustrated is a schematic illustration of how different portions of a warped image 300 are differently magnified by an optical element 302 to produce an image 300' on an image plane, in accordance with an embodiment of the present disclosure. The warped image 300 is rendered via an image renderer, wherefrom a projection of the warped image 300 is directed towards a user's eye. There are shown different portions 300A, 300B, 300C, 300D, 300E, 300F, 300G, 300H and 300I of the warped image 300. Notably, the portions 300D, 300E and 300F collectively constitute a first portion of the warped image 300, while the portions 300A, 300B, 300C, 300G, 300H and 300I collectively constitute a second portion of the warped image 300.

Upon passing through the optical element 302, projections of the first portion and the second portion of the warped image 300 are differently magnified to produce on the image plane a first de-warped portion and a second de-warped portion of the produced image 300', respectively. The first de-warped portion of the image 300' includes de-warped portions 300D', 300E' and 300F', while the second de-warped portion includes de-warped portions 300A', 300B', 300C', 300G', 300H' and 300I'. Notably, the regions 300D', 300E', and 300F' are de-magnified, while the regions 300A', 300B', 300C', 300G', 300H' and 300I' are magnified.

FIG. 3 is merely an example, which should not unduly limit the scope of the claims herein. A person skilled in the art will recognize many variations, alternatives, and modifications of embodiments of the present disclosure. For example, projections of certain portions of the warped image may be neither magnified nor de-magnified.

Figure 4A:
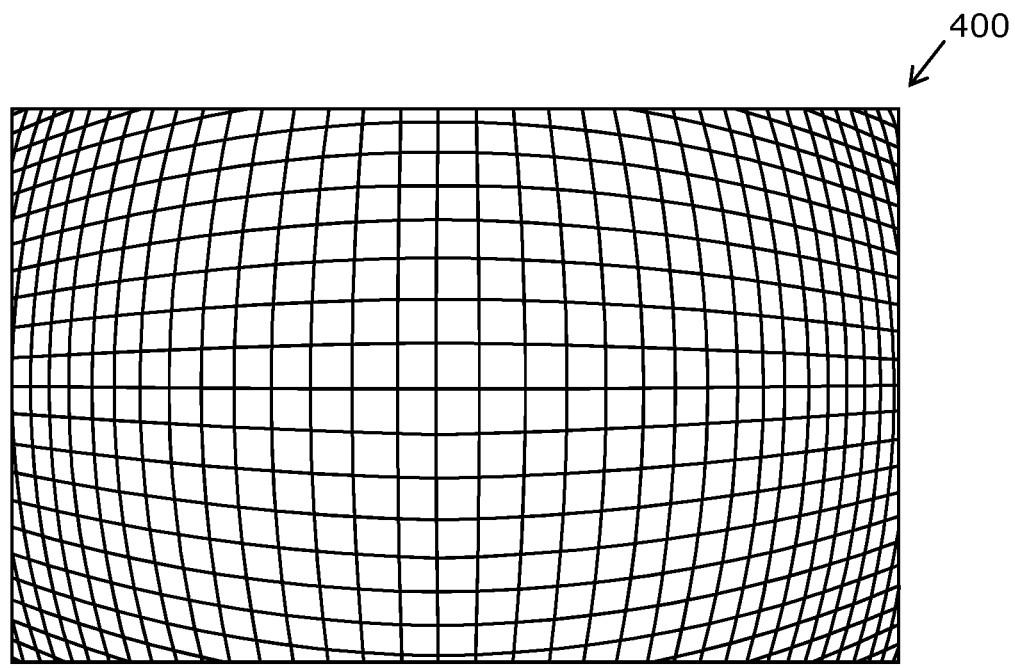
FIG. 4A is an example illustration of a warped image as rendered via an image renderer, in accordance with an embodiment of the present disclosure.

Referring to FIG. 4A, illustrated is an example illustration of a warped image 400 as rendered via an image renderer, in accordance with an embodiment of the present disclosure. The warped image 400 comprises a first portion (depicted, for example, as a central portion of the warped image 400) and a second portion (depicted, for example, as a peripheral portion of the warped image 400). The warped image 400 has a same angular resolution across an image rendering surface of the image renderer.

Figure 4B:
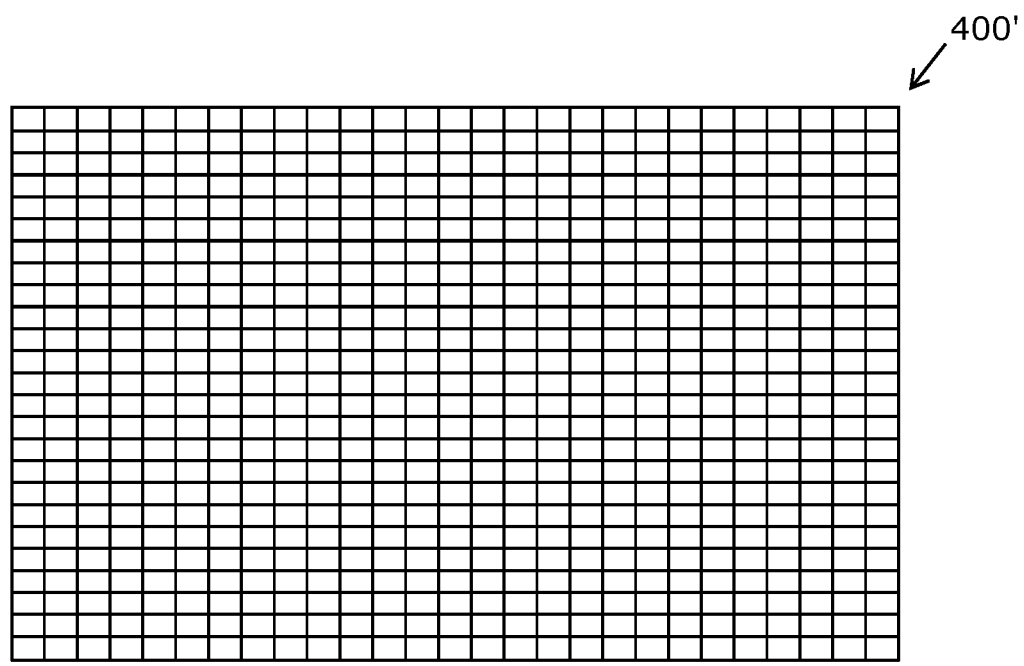
FIG. 4B is an example illustration of an image that is produced on an image plane when the warped image passes through or reflects from at least one optical element arranged on an optical path between the image renderer and the image plane, in accordance with an embodiment of the present disclosure.

Referring to FIG. 4B, illustrated is an example illustration of an image 400' that is produced on an image plane when the warped image 400 passes through or reflects from at least one optical element arranged on an optical path between the image renderer and the image plane, in accordance with an embodiment of the present disclosure. Notably, projections of the first portion and the second portion of the warped image 400 are differently magnified by a first optical portion and a second optical portion of the at least one optical element, respectively, to produce the image 400' on the image plane in a manner that the produced image 400' appears de-warped to the user. As shown, the projection of the first portion of the warped image 400 is de-magnified, whereas the projection of the second portion of the warped image 400 is magnified to produce the image 400'. As a result, the produced image 400' comprises a first de-warped portion (depicted, for example, as a central portion of the produced image 400') and a second de-warped portion (depicted, for example, as a peripheral portion of the produced image 400'), wherein an angular resolution of the first de-warped portion of the produced image 400' is greater than an angular resolution of the second de-warped portion of the produced image 400'.

Figure 5:
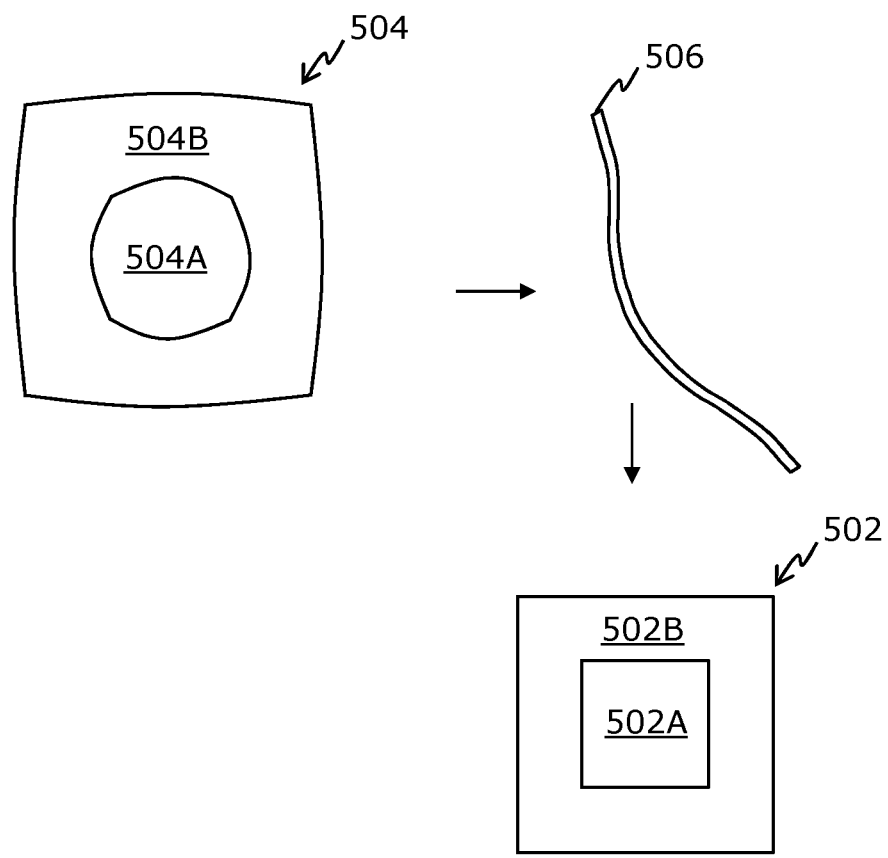
FIG. 5 is a simplified illustration of an image that is produced on an image plane when a warped image passes through or reflects from at least one optical element arranged on an optical path between an image renderer and the image plane, in accordance with an embodiment of the present disclosure.

Referring to FIG. 5, illustrated is a simplified illustration of an image 502 that is produced on an image plane when a warped image 504 passes through or reflects from at least one optical element 506 arranged on an optical path between an image renderer and the image plane, in accordance with an embodiment of the present disclosure. The warped image 504 has a same angular resolution across an image rendering surface of the image renderer. Notably, projections of a first portion 504A and a second portion 504B of the warped image 504 are differently magnified by a first optical portion and a second optical portion of the optical element 506, respectively, to produce the image 502 on the image plane in a manner that the produced image 502 appears de-warped to a user. The produced image 502 comprises a first de-warped portion 502A and a second de-warped portion 502B corresponding to the first portion 504A and the second portion 504B of the warped image 504, respectively. Furthermore, the produced image 502 has a spatially-variable angular resolution wherein an angular resolution of the first de-warped portion 502A is greater than an angular resolution of the second de-warped portion 502B.

FIG. 5 is merely an example, which should not unduly limit the scope of the claims herein. A person skilled in the art will recognize many variations, alternatives, and modifications of embodiments of the present disclosure.

Figure 6A:
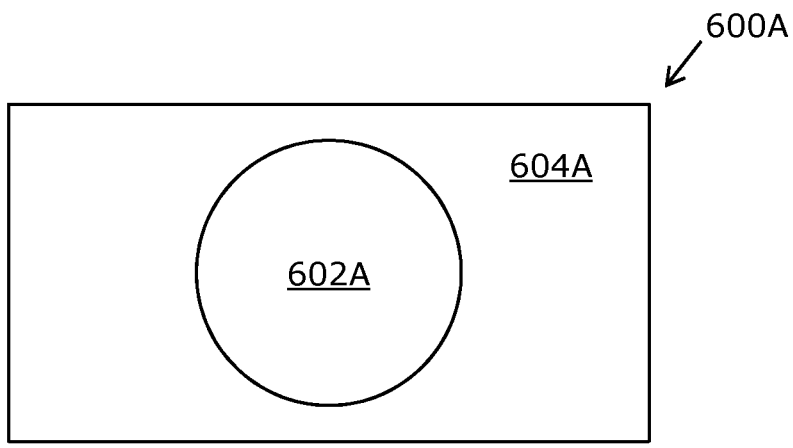
FIGS. 6A, 6B and 6C are example schematic illustrations of de-warped portions of images that are produced on an image plane, in accordance with different embodiments of the present disclosure.
Figure 6B:
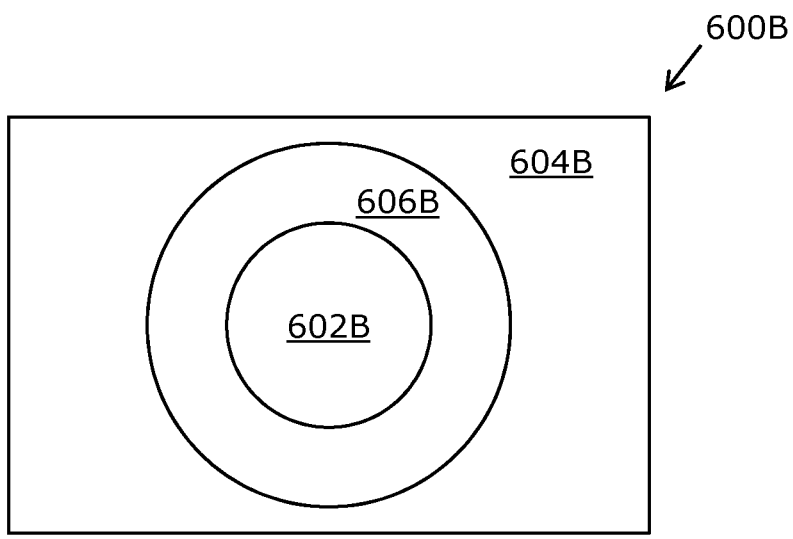
Figure 6C:
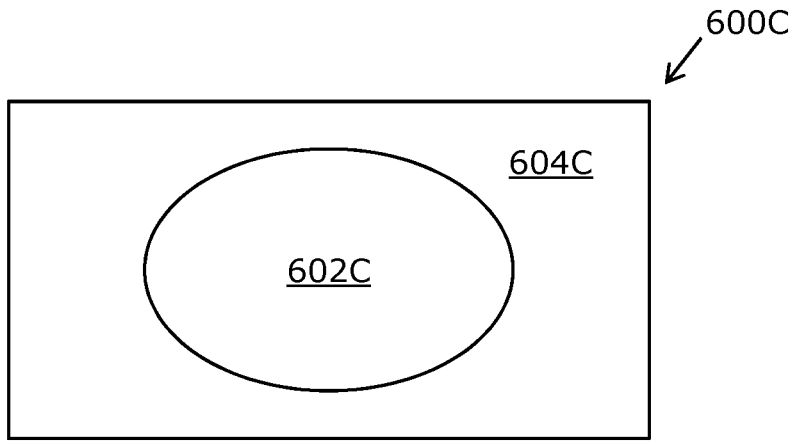

Referring to FIGS. 6A, 6B and 6C, illustrated are example schematic illustrations of de-warped portions of images that are produced on an image plane, said de-warped portions having different angular resolutions, in accordance with different embodiments of the present disclosure.

In FIG. 6A, a produced image 600A comprises a first de-warped portion 602A and a second de-warped portion 604A. The angular resolution of the first de-warped portion 602A is greater than the angular resolution of the second de-warped portion 604A, pursuant to embodiments of the present disclosure. As shown, the shape of the first de-warped portion 602A is substantially circular, pursuant to an embodiment of the present disclosure. As a result, the angular resolution of a given de-warped portion of the produced image 600A (measured as a function of an angular distance between the given de-warped portion of the produced image 600A and a center of the produced image 600A) would vary similarly in different directions (for example, horizontal and vertical directions).

In FIG. 6B, a produced image 600B comprises a first de-warped portion 602B, a second de-warped portion 604B and an intermediary de-warped portion 606B between the first de-warped portion 602B and the second de-warped portion 604B. The angular resolution of the intermediary de-warped portion 606B is greater than the angular resolution of the second de-warped portion 604B, but smaller than the angular resolution of the first de-warped portion 602B. As shown, the shape of the first de-warped portion 602B and the intermediary de-warped portion 606B is substantially circular, pursuant to an embodiment of the present disclosure. As a result, the angular resolution of a given de-warped portion of the produced image 600B (measured as a function of an angular distance between the given de-warped portion of the produced image 600B and a center of the produced image 600B) would vary similarly in different directions (for example, the horizontal and vertical directions).

In FIG. 6C, a produced image 600C comprises a first de-warped portion 602C and a second de-warped portion 604C. The angular resolution of the first de-warped portion 602C is greater than the angular resolution of the second de-warped portion 604C. As shown, the shape of the first de-warped portion 602C is substantially elliptical, pursuant to another embodiment of the present disclosure. As a result, the angular resolution of a given de-warped portion of the produced image 600C (measured as a function of an angular distance between the given de-warped portion of the produced image 600C and a center of the produced image 600C) would vary differently in different directions.

Figure 7:
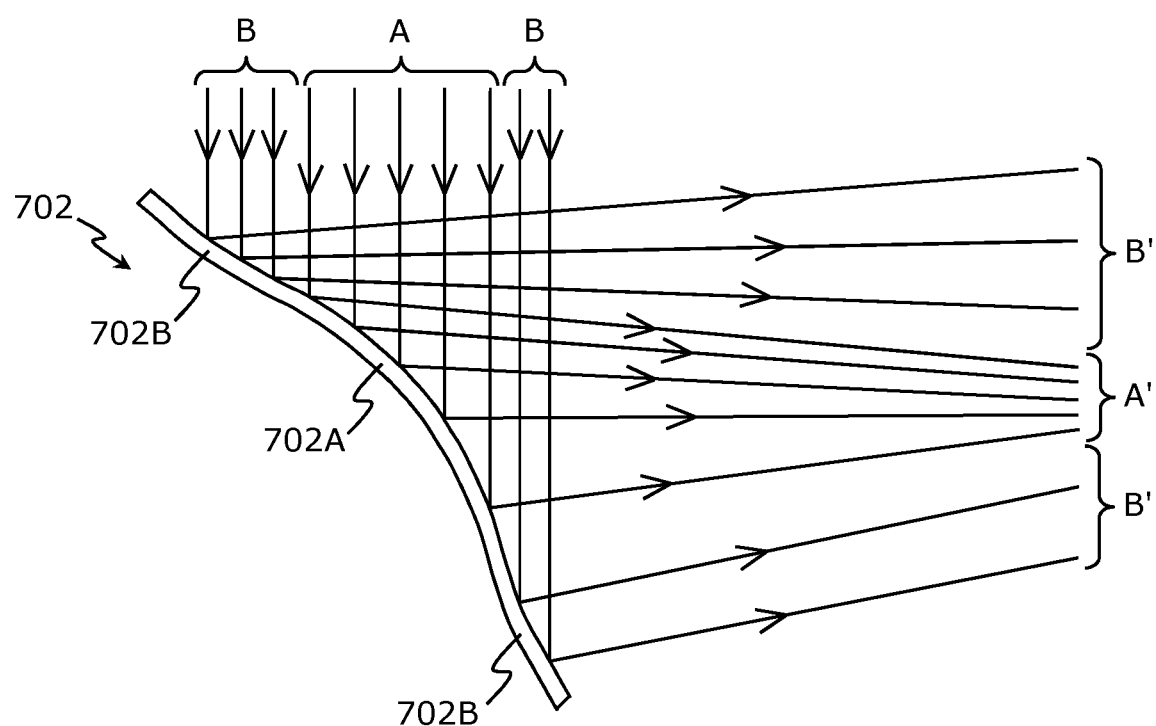
FIG. 7 is an illustration of how a projection of a warped image is reflected from an optical element, in accordance with an embodiment of the present disclosure.

Referring to FIG. 7, illustrated is an illustration of how a projection of a warped image is reflected from an optical element 702, in accordance with an embodiment of the present disclosure. The projection of the warped image comprises a projection A of a first portion of the warped image and a projection B of a second portion of the warped image. The projections A and B of the first portion and the second portion of the warped image are differently magnified by a first optical portion 702A and a second optical portion 702B of the optical element 702, respectively, to yield a projection of the produced image. The projection of the produced image comprises a projection A' of a first de-warped portion of the produced image and a projection B' of a second de-warped portion of the produced image. As shown, the projection A of the first portion of the warped image is de-magnified by the first optical portion 702A to yield the projection A' of a first de-warped portion of the produced image, whereas the projection B of the first portion of the warped image is magnified by the second optical portion 702B to yield the projection B' of a second de-warped portion of the produced image.

FIG. 7 is merely an example, which should not unduly limit the scope of the claims herein. A person skilled in the art will recognize many variations, alternatives, and modifications of embodiments of the present disclosure.

Figure 8A:
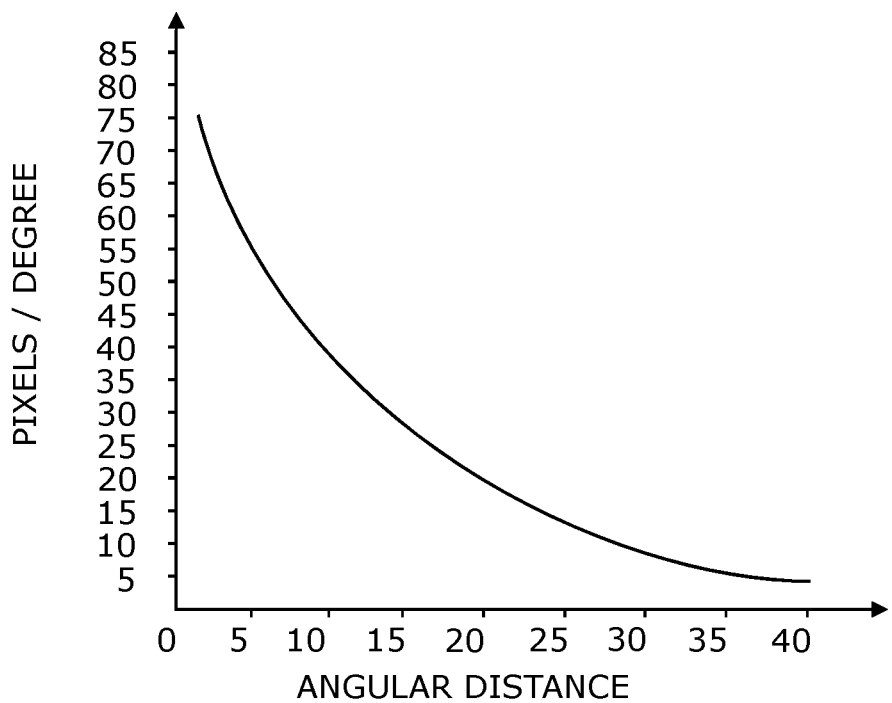
FIGS. 8A, 8B and 8C are example graphical representations of an angular resolution of a produced image as a function of an angular distance between a center of a first de-warped portion of the produced image and an edge of the produced image, in accordance with different embodiments of the present disclosure.
Figure 8B:
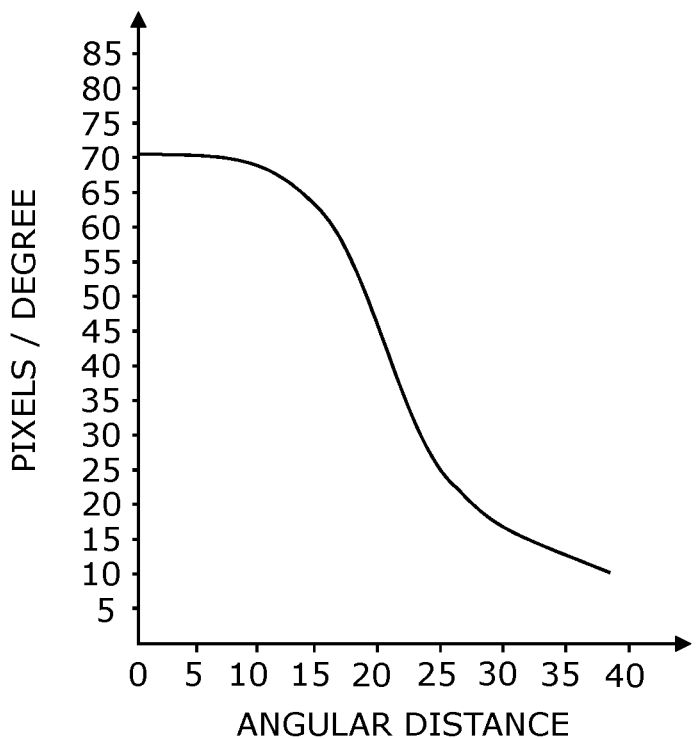
Figure 8C:
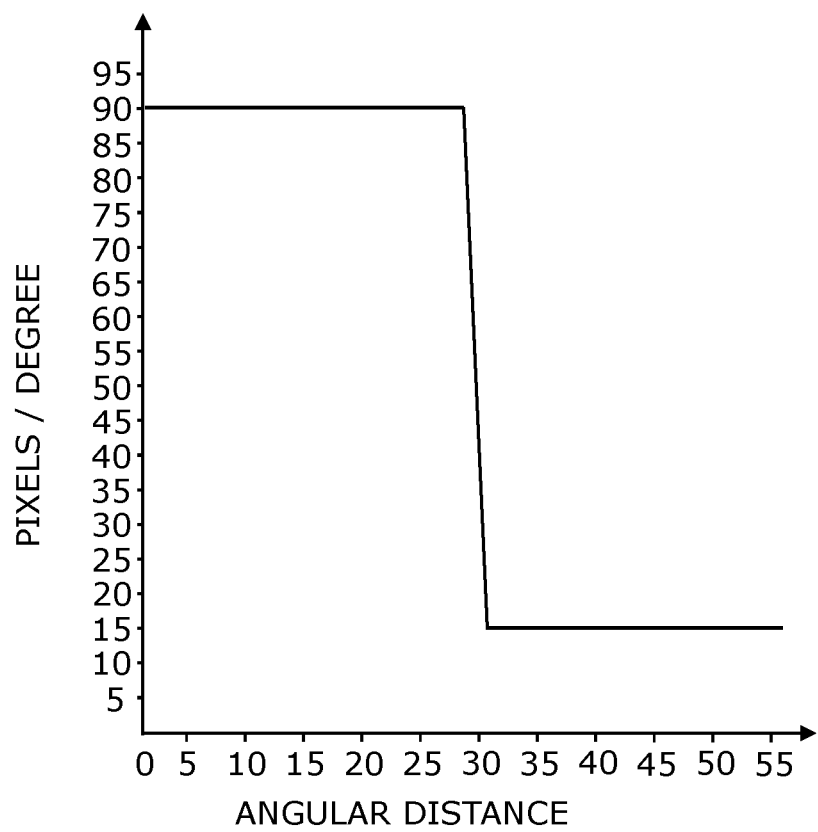

Referring to FIGS. 8A, 8B and 8C, illustrated are example graphical representations of an angular resolution of a produced image as a function of an angular distance between a center of a first de-warped portion of the produced image and an edge of the produced image, the produced image having a spatially-variable angular resolution, in accordance with different embodiments of the present disclosure.

In FIG. 8A, the angular resolution of the produced image varies as a non-linear gradient function across an angular width of the produced image. Notably, the angular resolution is the maximum near the center of the first de-warped portion of produced image, and decreases exponentially on going from the center of the first de-warped portion towards an edge of the produced image.

In FIG. 8B, the angular resolution of the produced image varies as a non-linear gradient function across an angular width of the produced image. Notably, the angular resolution is the maximum near the center of the first de-warped portion of produced image, and decreases non-linearly on going from the center of the first de-warped portion towards an edge of the produced image. As an example, the angular resolution of the first de-warped portion (namely, a de-warped portion spanning approximately zero to 30 degrees of the angular width) of the produced image is much greater than the angular resolution of a second de-warped portion (namely, a de-warped portion spanning approximately 30 to 80 degrees of the angular width) of the produced image.

In FIG. 8C, the angular resolution of the produced image varies as a step gradient function across an angular width of the produced image. Notably, the angular resolution varies across the produced image in a step-wise manner. As an example, the angular resolution of the first de-warped portion (namely, a de-warped portion spanning approximately zero to 60 degrees of the angular width) of the produced image is much greater than the angular resolution of a second de-warped portion (namely, a portion spanning approximately 60 to 110 degrees of the angular width) of the produced image.

Figure 9A:
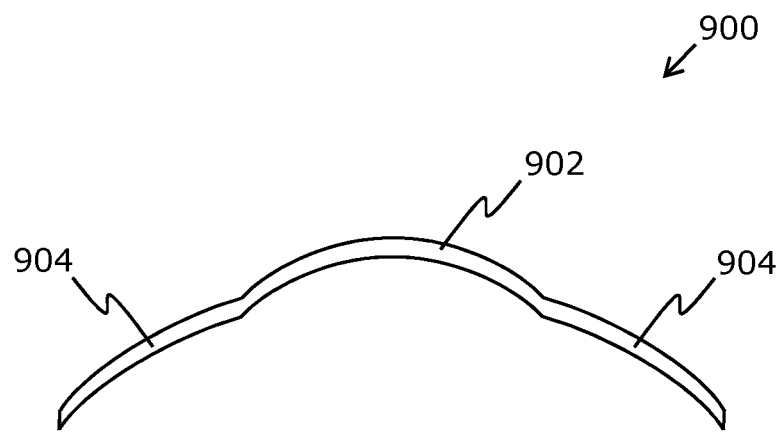

Referring to FIG. 9A, illustrated is a simplified illustration of a profile of a given optical element 900, in accordance with an embodiment of the present disclosure. As shown, the optical element 900 comprises at least a first optical portion 902 and a second optical portion 904 having different optical properties with respect to magnification.

Figure 9B:
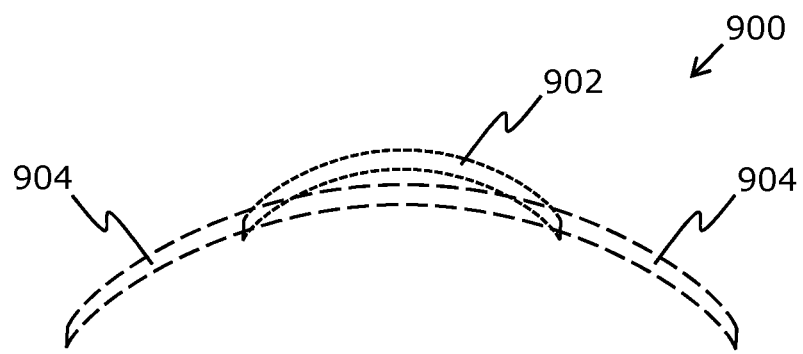
FIG. 9B is a detailed illustration of the profile of the given optical element, in accordance with an embodiment of the present disclosure

Referring to FIG. 9B, illustrated is a detailed illustration of the profile of the given optical element 900, in accordance with an embodiment of the present disclosure. As shown, the first optical portion 902 and the second optical portion 904 are implemented as separate optical elements (for example, such as spherical mirrors). Notably, a radius of curvature of a spherical mirror forming the first optical portion 902 is lesser than a radius of curvature of another spherical mirror forming the second optical portion 904. Furthermore, curvatures of such spherical mirrors are smoothly matched to form a continuous profile of the given optical element 900.

FIGS. 9A and 9B are merely examples, which should not unduly limit the scope of the claims herein. A person skilled in the art will recognize many variations, alternatives, and modifications of embodiments of the present disclosure. For example, the optical element 900 can be implemented as a single lens or mirror having a complex shape or as a configuration of lenses and/or mirrors.

Figure 10A:
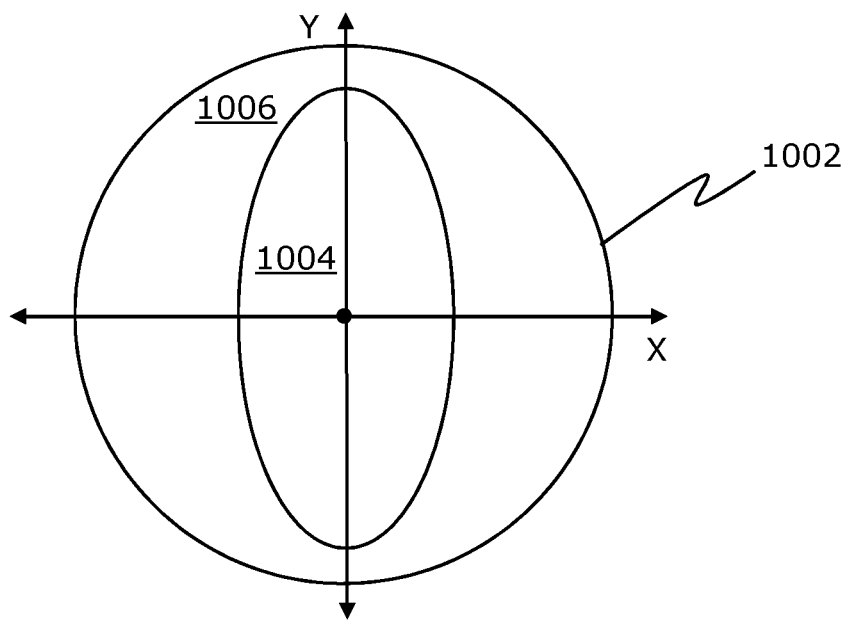
Figure 10B:
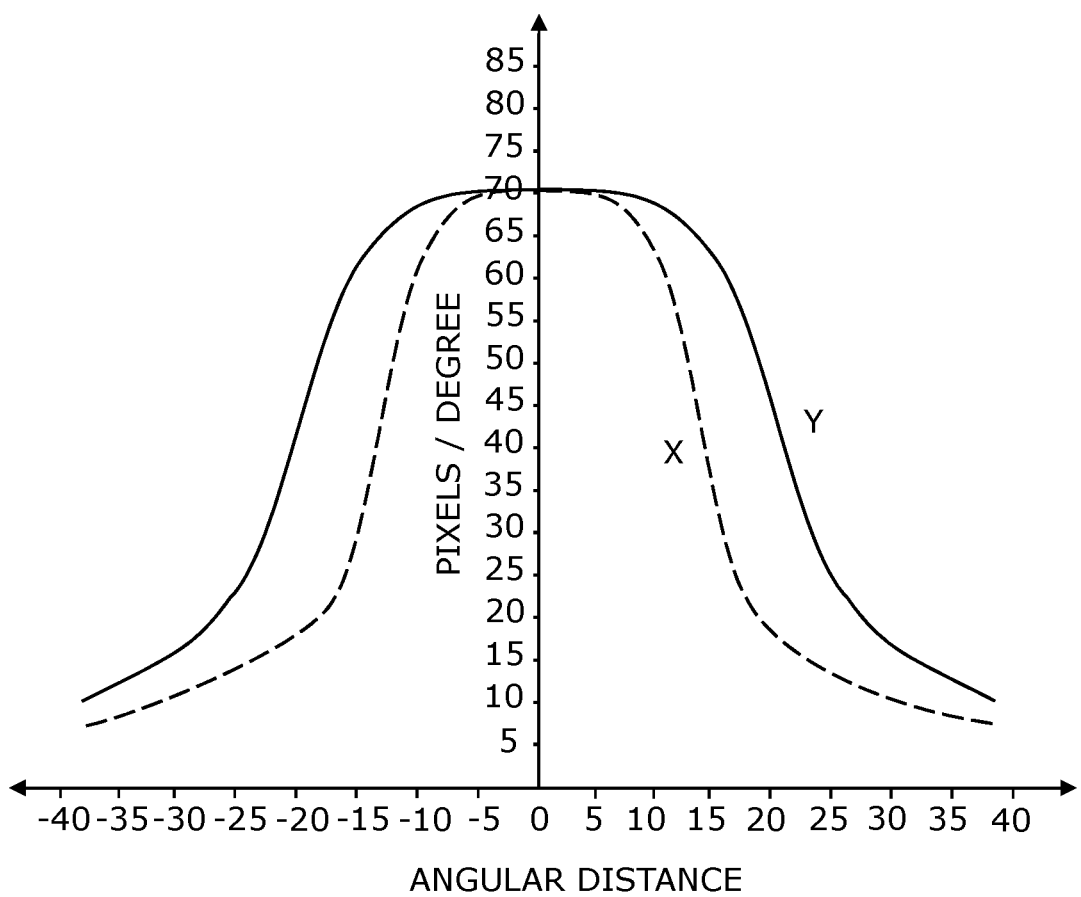
FIG. 10B is an example graphical representation of an angular resolution of a de-warped portion of an image produced on an image plane as a function of an angular distance between the de-warped portion of the produced image and a center of the produced image, the warped image being optically de-warped using the symmetrical optical element in order to produce said image, in accordance with an embodiment of the present disclosure.

Referring to FIG. 10A, illustrated is a schematic illustration of a symmetrical optical element 1002, while FIG. 10B is an example graphical representation of an angular resolution of a de-warped portion of an image produced on an image plane as a function of an angular distance between the de-warped portion of the produced image and a center of the produced image, the warped image being optically de-warped using the symmetrical optical element 1002 in order to produce said image, in accordance with an embodiment of the present disclosure.

In this example implementation, the symmetrical optical element 1002 is depicted as a lens that is symmetrical about its optical axis. The symmetrical optical element 1002 comprises a first optical portion 1004 and a second optical portion 1006 having different optical properties with respect to magnification. The first optical portion 1004 is shown to be substantially elliptical in shape.

In FIG. 10A, there is also shown an optical center (depicted by a black dot) of the first optical portion 1004, which is also an optical center of the symmetrical optical element 1002. Two lines representing X and Y directions pass through the optical center, which overlaps with a center of the warped image.

As shown in FIG. 10B, the angular resolution is the maximum near the center of the produced image, and decreases non-linearly on going from the center towards an edge of the produced image. The angular resolution of a de-warped portion of the produced image that spans approximately from −10 degrees to +10 degrees of a field of view along the X-direction and from −20 degrees to +20 degrees of the field of view along the Y-direction is much greater than the angular resolution of a remaining de-warped portion of the produced image.

FIGS. 10A and 10B are merely examples, which should not unduly limit the scope of the claims herein. A person skilled in the art will recognize many variations, alternatives, and modifications of embodiments of the present disclosure. It will be appreciated that the optical element 1002 has been depicted as a lens, for the sake of convenience only; the optical element 1002 is not limited to a particular type of optical element. In other words, the optical element 1002 can be implemented as a single lens or mirror having a complex shape, or as a configuration of lenses and/or mirrors.

Figure 11:
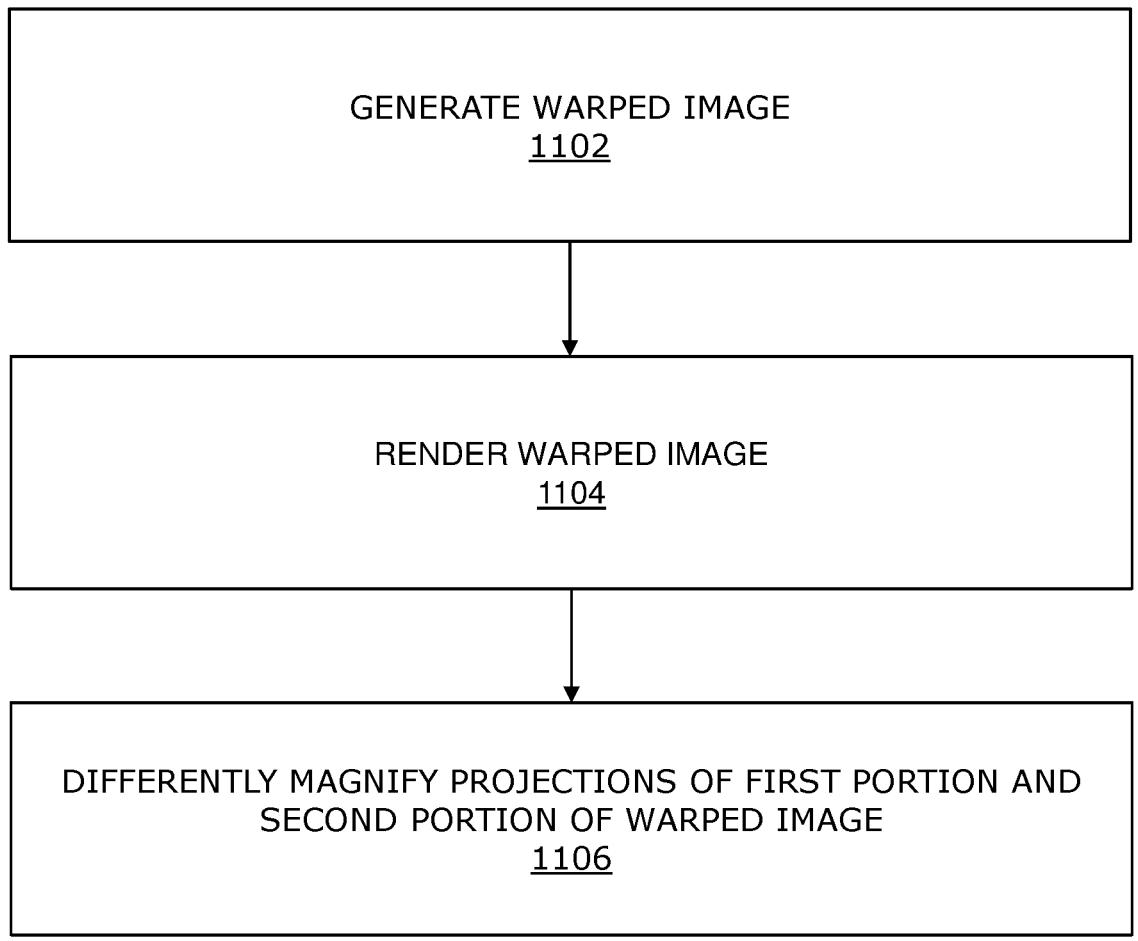
FIG. 11 illustrates steps of a method of producing an image having a spatially-variable angular resolution on an image plane, in accordance with an embodiment of the present disclosure.

Referring to FIG. 11, illustrated are steps of a method of producing an image having a spatially-variable angular resolution on an image plane, in accordance with an embodiment of the present disclosure. The method is depicted as a collection of steps in a logical flow diagram, which represents a sequence of steps that can be implemented in hardware, software, or a combination thereof, for example as aforementioned.

The method is implemented via a display apparatus comprising an image renderer and at least one optical element arranged on an optical path between the image renderer and the image plane. The at least one optical element comprises at least a first optical portion and a second optical portion having different optical properties with respect to magnification.

At a step 1102 a warped image is generated based upon the optical properties of the first optical portion and the second optical portion of the at least one optical element. At a step 1104, the warped image is rendered via the image renderer. At a step 1106, projections of a first portion and a second portion of the warped image are differently magnified by the first optical portion and the second optical portion, respectively, to produce the image on the image plane in a manner that the produced image appears de-warped to the user.

The steps 1102 to 1106 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A display apparatus for producing an image having a spatially-variable angular resolution on an image plane, the display apparatus comprising:
    an image renderer per eye;
    at least one optical element arranged on an optical path between the image renderer and the image plane, the at least one optical element comprising at least a first optical portion and a second optical portion having different optical properties with respect to magnification; and
    a processor coupled to the image renderer, wherein the processor or an image source communicably coupled to the processor is configured to generate a warped image based upon the optical properties of the first optical portion and the second optical portion,
    wherein the processor is configured to render the warped image via the image renderer, wherein projections of a first portion and a second portion of the warped image are to be differently magnified by the first optical portion and the second optical portion of the at least one optical element, respectively, to produce the image on the image plane in a manner that the produced image appears de-warped to a user, and
    wherein, when generating the warped image, the processor or the image source is configured to adjust an intensity of the first portion and the second portion of the warped image in a manner that, upon being differently magnified, the projections of the first portion and the second portion of the warped image produce the image on the image plane that appears to have a uniform brightness across the image.

2. The display apparatus of claim 1, further comprising means for detecting a gaze direction of the user, the gaze direction being detected with respect to the image plane, wherein the processor or the image source is configured to generate the warped image based upon the detected gaze direction of the user.

3. The display apparatus of claim 1, further comprising means for tracking a head orientation of the user, wherein the processor or the image source is configured to generate the warped image based upon the head orientation of the user.

4. The display apparatus of claim 1, wherein the projection of the first portion of the warped image is to be de-magnified by the first optical portion of the at least one optical element, and the projection of the second portion of the warped image is to be magnified by the second optical portion of the at least one optical element.

5. The display apparatus of claim 1, wherein the projections of the first portion and the second portion of the warped image are to be magnified by the first optical portion and the second optical portion of the at least one optical element, respectively, wherein the projection of the second portion of the warped image is to be magnified to a greater extent than the projection of the first portion of the warped image.

6. The display apparatus of claim 1, wherein the projections of the first portion and the second portion of the warped image are to be de-magnified by the first optical portion and the second optical portion of the at least one optical element, respectively, wherein the projection of the first portion of the warped image is to be de-magnified to a greater extent than the projection of the second portion of the warped image.

7. The display apparatus of claim 1, wherein the at least one optical element is symmetrical with respect to its optical axis, the first optical portion surrounding an optical center of the at least one optical element, the second optical portion surrounding the first optical portion.

8. The display apparatus of claim 1, wherein the at least one optical element is a free-form mirror.

9. The display apparatus of claim 1, wherein the at least one optical element is a free-form lens.

10. The display apparatus of claim 1, wherein the at least one optical element is an aspheric mirror.

11. The display apparatus of claim 1, wherein the at least one optical element is an aspheric lens.

12. A method of producing an image having a spatially-variable angular resolution on an image plane, the method being implemented via a display apparatus comprising an image renderer and at least one optical element arranged on an optical path between the image renderer and the image plane, the method comprising:
    generating a warped image based upon optical properties of a first optical portion and a second optical portion of the at least one optical element, wherein the first optical portion and the second optical portion have different optical properties with respect to magnification;
    rendering the warped image via the image renderer; and
    differently magnifying projections of a first portion and a second portion of the warped image by the first optical portion and the second optical portion of the at least one optical element, respectively, to produce the image on the image plane in a manner that the produced image appears de-warped to a user;
    wherein the step of generating the warped image comprises adjusting an intensity of the first portion and the second portion of the warped image in a manner that, upon being differently magnified, the projections of the first portion and the second portion of the warped image produce the image on the image plane that appears to have a uniform brightness across the image.

13. The method of claim 12, further comprising detecting a gaze direction of the user with respect to the image plane, wherein the warped image is generated based upon the detected gaze direction of the user.

14. The method of claim 12, further comprising tracking a head orientation of the user, wherein the warped image is generated based upon the head orientation of the user.

15. The method of claim 12, wherein the step of differently magnifying comprises de-magnifying the projection of the first portion of the warped image by the first optical portion of the at least one optical element, whilst magnifying the projection of the second portion of the warped image by the second optical portion of the at least one optical element.

16. The method of claim 12, wherein the step of differently magnifying comprises magnifying the projections of the first portion and the second portion of the warped image by the first optical portion and the second optical portion of the at least one optical element, respectively, wherein the projection of the second portion of the warped image is magnified to a greater extent than the projection of the first portion of the warped image.

17. The method of claim 12, wherein the step of differently magnifying comprises de-magnifying the projections of the first portion and the second portion of the warped image by the first optical portion and the second optical portion of the at least one optical element, respectively, wherein the projection of the first portion of the warped image is de-magnified to a greater extent than the projection of the second portion of the warped image.

* * * * *